United States Patent
Aoai et al.

(10) Patent No.: US 12,401,840 B2
(45) Date of Patent: Aug. 26, 2025

(54) INFORMATION PROCESSING DEVICE AND INFORMATION PROCESSING METHOD

(71) Applicant: SONY GROUP CORPORATION, Tokyo (JP)

(72) Inventors: Shosuke Aoai, Tokyo (JP); Tasuku Inui, Tokyo (JP); Kohta Horiuchi, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 18/548,217

(22) PCT Filed: Jan. 26, 2022

(86) PCT No.: PCT/JP2022/002833
§ 371 (c)(1),
(2) Date: Aug. 28, 2023

(87) PCT Pub. No.: WO2022/185795
PCT Pub. Date: Sep. 9, 2022

(65) Prior Publication Data
US 2024/0305843 A1  Sep. 12, 2024

(30) Foreign Application Priority Data
Mar. 5, 2021 (JP) .................. 2021-035215

(51) Int. Cl.
*H04N 21/238* (2011.01)
*H04N 21/2187* (2011.01)
(52) U.S. Cl.
CPC ....... *H04N 21/238* (2013.01); *H04N 21/2187* (2013.01)

(58) Field of Classification Search
CPC .................. H04N 21/238; H04N 21/2187
See application file for complete search history.

(56) References Cited

U.S. PATENT DOCUMENTS

| | | | |
|---|---|---|---|
| 11,451,864 B2* | 9/2022 | Mittal | H04N 21/8456 |
| 2012/0284421 A1* | 11/2012 | Xiao | H04N 21/4316 |
| | | | 709/231 |
| 2013/0226979 A1* | 8/2013 | Caruso | G06F 16/116 |
| | | | 707/827 |

FOREIGN PATENT DOCUMENTS

| | | |
|---|---|---|
| JP | 11-069325 A | 3/1999 |
| JP | 2001-251258 A | 9/2001 |
| JP | 2002-344654 A | 11/2002 |
| JP | 2016-032160 A | 3/2016 |

(Continued)

OTHER PUBLICATIONS

International Search Report and Written Opinion of PCT Application No. PCT/JP2022/002833, issued on Apr. 12, 2022, 09 pages of ISRWO.

*Primary Examiner* — Nnenna N Ekpo
(74) *Attorney, Agent, or Firm* — CHIP LAW GROUP

(57) ABSTRACT

An information processing device includes a processing unit. The processing unit selects one communication section from a plurality of communication sections having different communication schemes, on the basis of broadcast information indicating a broadcast use of a video to be transferred and broadcast status information indicating a status of utilization of the video when the broadcast information indicates live streaming for providing an optimal communication environment while suppressing power consumption.

10 Claims, 9 Drawing Sheets

(56) References Cited

FOREIGN PATENT DOCUMENTS

| JP | 2018-085678 A | 5/2018 |
|---|---|---|
| WO | 2019/073802 A1 | 4/2019 |

\* cited by examiner

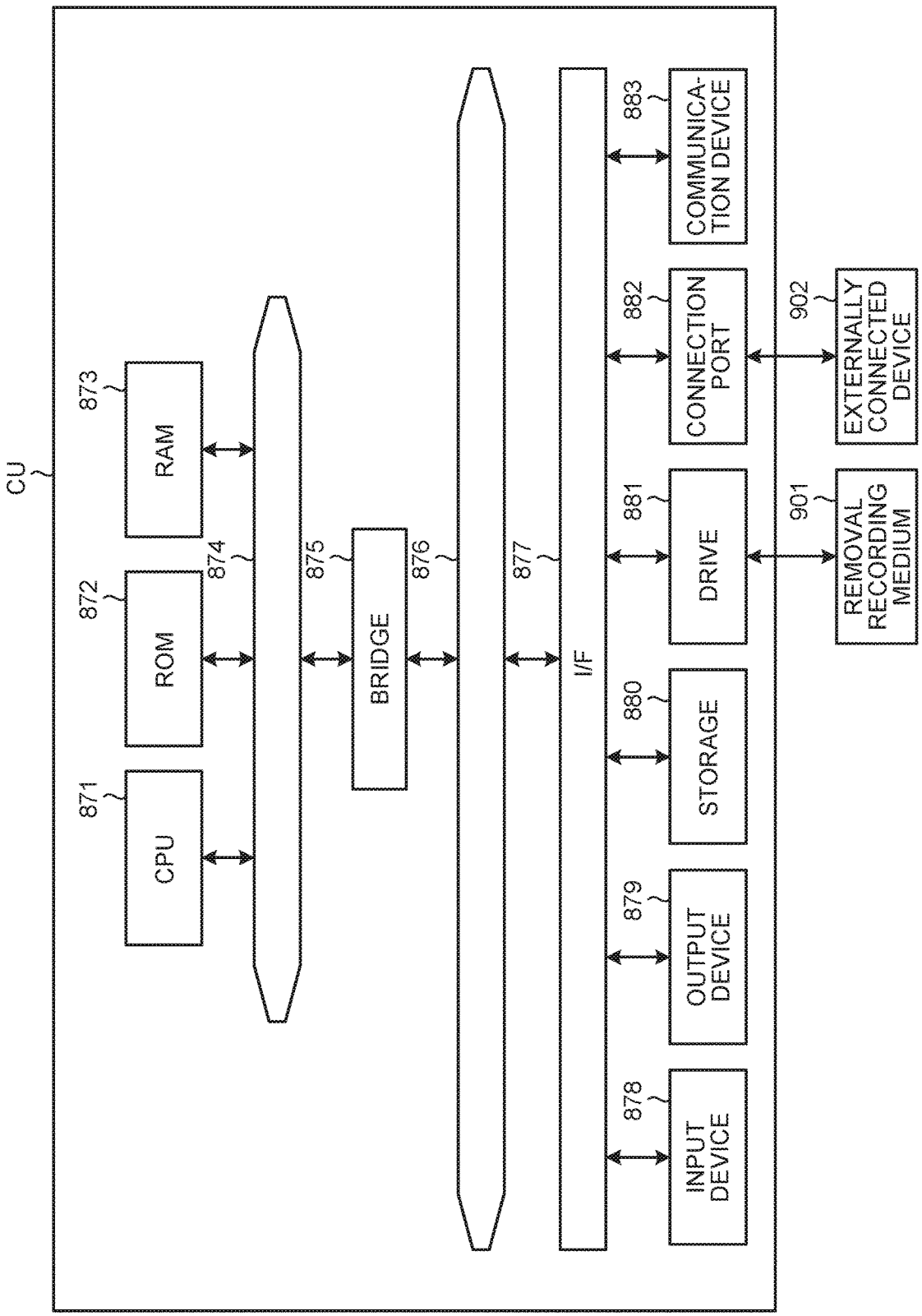

INFORMATION PROCESSING DEVICE AND INFORMATION PROCESSING METHOD

CROSS REFERENCE TO RELATED APPLICATIONS

This application is a U.S. National Phase of International Patent Application No. PCT/JP2022/002833 filed on Jan. 26, 2022, which claims priority benefit of Japanese Patent Application No. JP 2021-035215 filed in the Japan Patent Office on Mar. 5, 2021. Each of the above-referenced applications is hereby incorporated herein by reference in its entirety.

FIELD

The present invention relates to an information processing device, an information processing method, and a program.

BACKGROUND

In recent years, larger communication capacity has been provided for transmission and reception using a wireless communication system, and practical use of a fifth generation mobile communication system (5G) has recently started. In such an environment, a system that transmits a captured video using an information processing device as a relay and uses the captured video for video production has also been studied.

In general, a communication unit having a large communicable capacity consumes a large amount of power but a communication device is not always in an environment where power supply can be always received. Therefore, a system is required that provides an optimal communication environment while suppressing power consumption.

CITATION LIST

Patent Literature

Patent Literature 1: JP 2016-32160 A

SUMMARY

Technical Problem

Patent Literature 1 discloses selection of any of communication sections consuming different amounts of power (communication capacities) to be used, according to information about an operation time of a relay device and a result of determination whether a (predicted) remaining battery level reaches a predetermined threshold when an identical operation is performed in communication by a certain communication section. However, there is no disclosure of control of communication for a video to be transferred, depending on the broadcast use thereof, while suppressing power consumption.

Therefore, the present disclosure proposes an information processing device, an information processing method, and a program that are configured to perform control of communication for a video to be transferred, depending on broadcast use thereof, while suppressing power consumption.

Solution to Problem

According to the present disclosure, an information processing device is provided that comprises a processing unit that selects one communication section from a plurality of communication sections having different communication schemes, based on broadcast information indicating a broadcast use of a video to be transferred. According to the present disclosure, an information processing method in which an information process of the information processing device is executed by a computer, and a program for causing the computer to execute the information process of the information processing device, are provided.

BRIEF DESCRIPTION OF DRAWINGS

FIG. 12 is a block diagram illustrating an exemplary hardware configuration of the communication unit.

DESCRIPTION OF EMBODIMENTS

Figure 1:
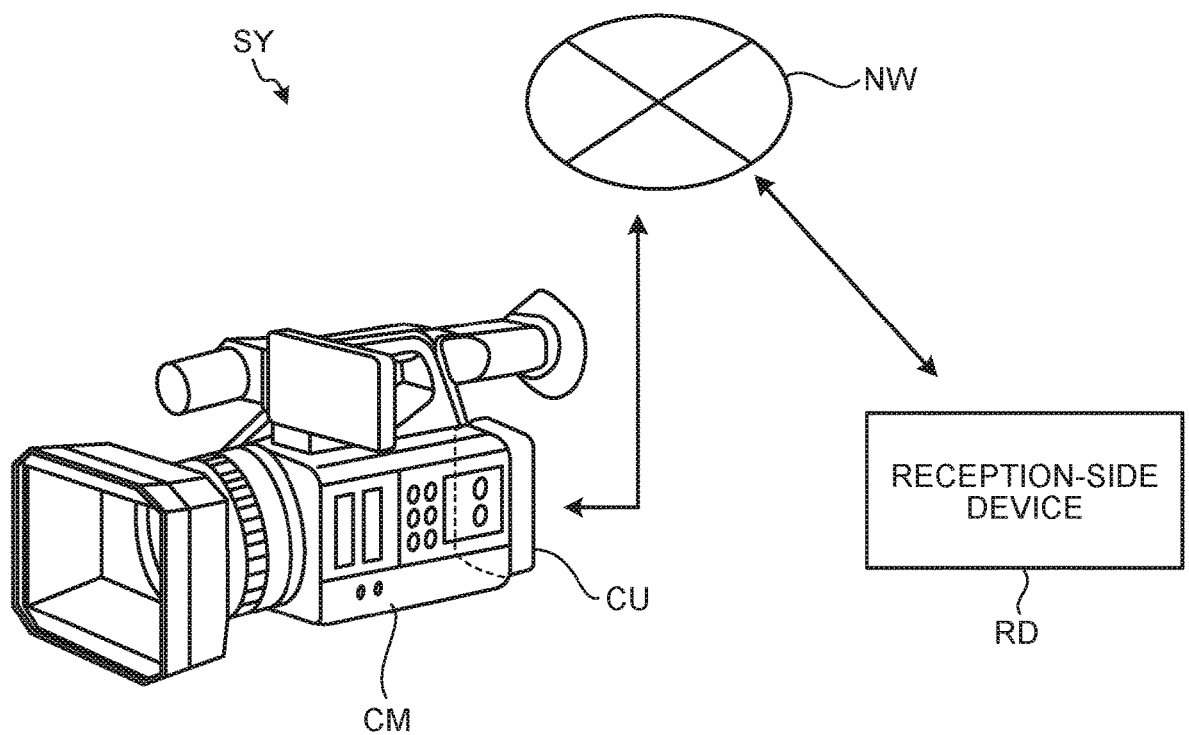
FIG. 1 is a diagram illustrating an example of a video production system using video streaming.

Embodiments of the present disclosure will be described in detail below with reference to the drawings. In the following embodiments, the same portions are denoted by the same reference numerals, and repetitive description thereof will be omitted.

Note that the description will be given in the following order.

[1. Video production system]
[2. Communication network]
[3. Configuration of communication unit]
[4. Configuration of imaging device]
[5. Video streaming]
[6. Information processing method]
[7. Exemplary hardware configuration]
[8. Effects]
[9. Modification]

1. Video Production System

FIG. 1 is a diagram illustrating an example of a video production system SY using video streaming.

The video production system SY is a system that transmits a video captured by a camera operator to a production site where a broadcast program is produced, by using a wireless communication channel. The video production system SY includes an imaging device CM, a communication unit CU, and a reception-side device RD.

The imaging device CM is, for example, a digital video camera for business use or consumer use. The imaging device CM may be a mobile terminal device such as a digital still camera, a smartphone, or a tablet terminal, capable of capturing a moving image or the like. The imaging device CM performs network communication by using a communication scheme such as 5G via the communication unit CU.

The communication unit CU receives a video captured by the imaging device CM through a wired or wireless connection, and transfers the video to the production site. The communication unit CU may be provided separately from the imaging device CM or may be incorporated in the imaging device CM. In the present disclosure, for example, a communication device separate from the imaging device CM is used as the communication unit CU.

The communication unit CU performs video streaming transmission to the reception-side device RD via a network NW. As the network NW, for example, the Internet, a home network, a local area network (LAN), a satellite communication network, and the other various networks are assumed.

Various devices are assumed as the reception-side device RD. For example, a cloud server, a network distribution server, a video server, a video editor, a video reproducing apparatus, a video recording apparatus, and a television apparatus, or an information processing apparatus such as a personal computer or mobile terminal having video processing functions equivalent thereto is assumed.

Figure 2:
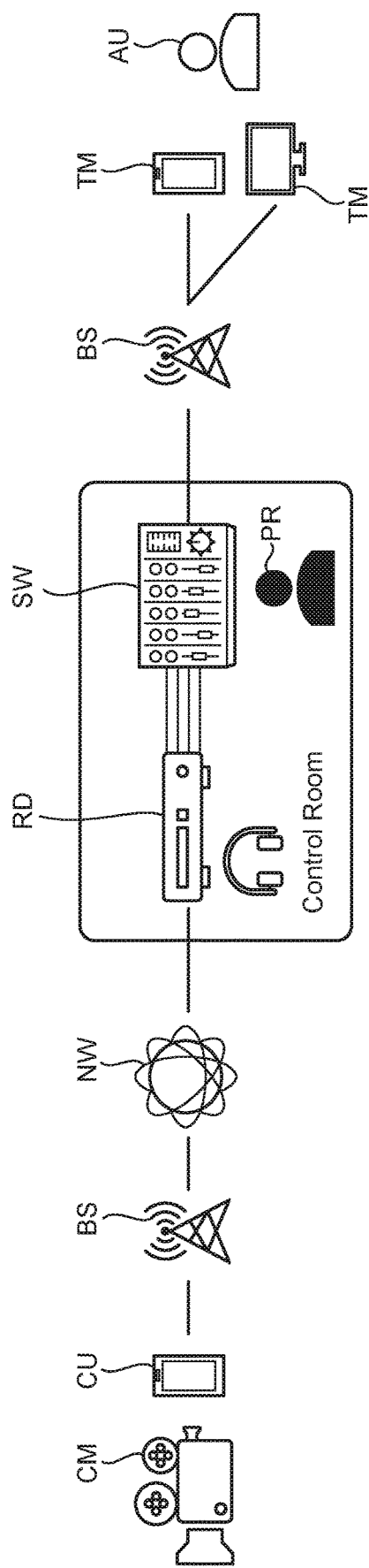
FIG. 2 is a diagram illustrating a process of production and distribution of a video.

FIG. 2 is a diagram illustrating a process of production and distribution of the video.

The camera operator connects the communication unit CU to the imaging device CM as a relay. The communication unit CU is connected to the network NW via a base station BS. The video captured by the imaging device CM is transmitted to the production site (control room) via wireless communication.

At the production site, an editor PR processes the transmitted videos and generates processed videos for broadcasting. The editor PR performs switching control of the processed videos by using a switcher SW or the like, for TV broadcast output or over-the-top (OTT) distribution. The distributed processed videos are each viewed by a viewer AU, via a communication terminal TM such as a television or a smartphone.

Note that, in pre-recorded broadcasting, the video transmitted to the production site is used only for confirming the contents of the video or performing pre-editing work, in some cases. In this case, a video actually used for broadcasting is separately recorded on a tape, disk, or the like and delivered.

2. Communication Network

Figure 3:
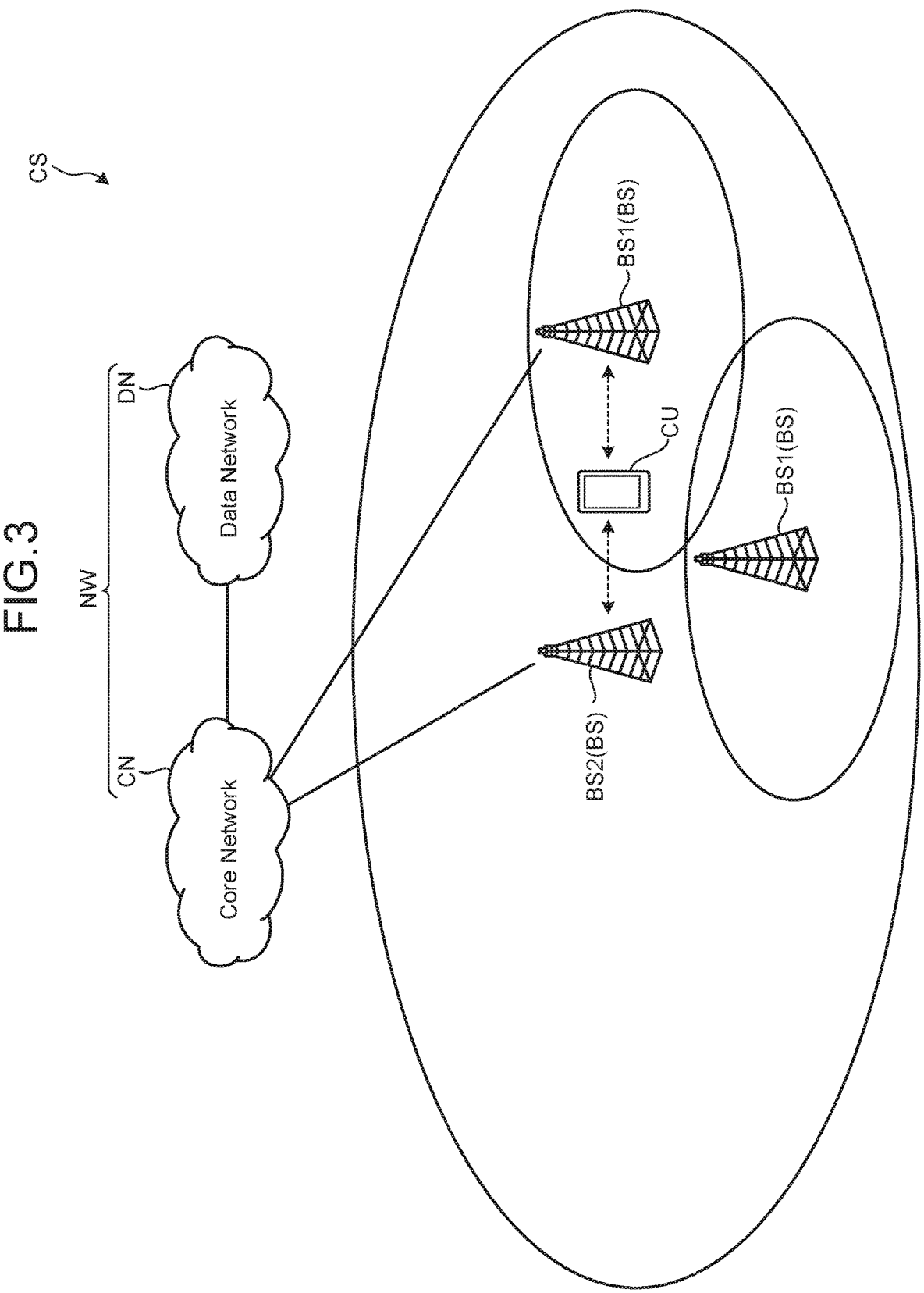
FIG. 3 is a diagram illustrating an exemplary network environment.

FIG. 3 is a diagram illustrating an exemplary network environment used in the present disclosure.

In recent years, the specifications of 5G-NR that is the next-generation wireless communication system have been studied in the Third Generation Partnership Project (3GPP). Specifically, 5G-NR includes enhanced mobile broadband (eMBB), massive machine type communication (mMTC), and ultra-reliable and low latency communications (URLLC) as the scope of standardization.

In particular, in order to achieve high-speed communication in eMBB, it is necessary to extend the frequency band used for wireless communication. Therefore, in 5G-NR, use of a high frequency band represented by, for example, a millimeter wave band has been studied. Specifically, in 5G-NR, a frequency band definitions enabling allocation to 24 GHz or more has been added. In use of a high frequency band, it is possible to perform high-speed communication than in a frequency band having been used before.

Meanwhile, when different frequency bands are used for communication, radio property changes. For example, in communication in a high frequency band, transmission power is higher than that in a frequency band used in 4G or earlier wireless communication systems, and thus, increasing power consumption upon transmitting a radio wave signal. In addition, for example, in communication in a high frequency band, it is assumed that a processing load on a modem of the terminal device increases and results in an increase in power consumption as compared with that in other frequency bands.

Meanwhile, depending on the amount of data of the cellular communication by the terminal device, speed as fast as the communication speed in the high frequency band is not necessarily required in some cases. For example, the amount of data communicated is small in the transmission and reception of a text message, and therefore, it is assumed that there is no problem even if the communication speed is not high as in the high frequency band.

In view of the above, it is desired to reduce power consumption by determining a frequency band according to a state of the terminal device or the purpose of communication.

Therefore, the communication unit CU according to an embodiment of the present disclosure has a function of determining a frequency band (communication scheme) to be used for communication on the basis of a state of the communication unit CU. This configuration allows for communication suitable for the state of the communication unit CU, and power consumption can be suppressed according to the state.

FIG. 3 illustrates a communication system CS that includes the communication unit CU, a plurality of the base stations BS, and the network NW. The plurality of the base stations BS includes, for example, a 5GNR base station BS1 and an LTE base station BS2. Hereinafter, an example of communication scheme selection between 4G/LTE and 5G will be described. In a 5G-NR communication system, for example, a non-standalone (NSA) mode is adopted. The NSA mode is a mode that uses a long term evolution (LTE) network, for implementing 5G-NR communication. Specifically, the NSA mode is a mode in which a control signal is transmitted and received through the LTE network and a data signal is transmitted and received through a 5G-NR network.

Meanwhile, the technology according to the present disclosure is also applicable to a standalone (SA) mode of the 5G-NR communication system. The SA mode is a mode that transmits and receives both of the control signal and the data signal through the 5G-NR network. As a matter of course, the 5G-NR communication system is merely an example, and the present technology is also applicable to other communication systems.

The 5GNR base station BS1 is a base station that provides 5G-NR wireless communication. The 5GNR base station BS1 is connected to a core network CN. Here, the core network CN is connected to a data network DN via a gateway device (not illustrated). In addition, a cell of the 5GNR base station BS1 can have a range smaller than that of a cell of the LTE base station BS2.

The communication unit CU is connected to the 5GNR base station BS1 or the LTE base station BS2 to enjoy a wireless communication service. The communication unit CU may be, for example, a smartphone. Note that the communication unit CU transmits and receives the control signal to and from the LTE base station BS2, and transmits and receives the data signal to and from the 5GNR base station BS1.

The communication unit CU determines a frequency band used for communication, from a plurality of independent frequency bands (communication schemes), on the basis of the positioning of the video to be transferred, in the broadcast program. Here, the positioning of the video in the broadcast program means the broadcast use of the video, a status of utilization of the video in live streaming, and the like. Examples of the broadcast use include live streaming, pre-recorded broadcasting, and the like. The status of utilization in the live streaming means whether the video is used as the distribution video or used only for the editor PR to confirm the contents of the video.

For example, in the pre-recorded broadcasting, the transmitted video is used only for the editor PR to confirm the contents of the video or to perform pre-editing work, in some cases. Such a video often has no problem even if the image quality is coarse. Even a video captured for live streaming is not always used entirely for the distribution video. A portion not used for the distribution video is only used for confirmation by the editor PR, and thus, high communication performance is not required. Therefore, the communication unit CU selects an appropriate communication scheme according to the communication performance required for the video, for each video to be transferred so as not to increase the power consumption due to excessive specifications.

The LTE base station BS2 is a base station that provides LTE wireless communication. The LTE base station BS2 is connected to the core network CN as in the 5GNR base station BS1.

3. Configuration of Communication Unit

Figure 4:
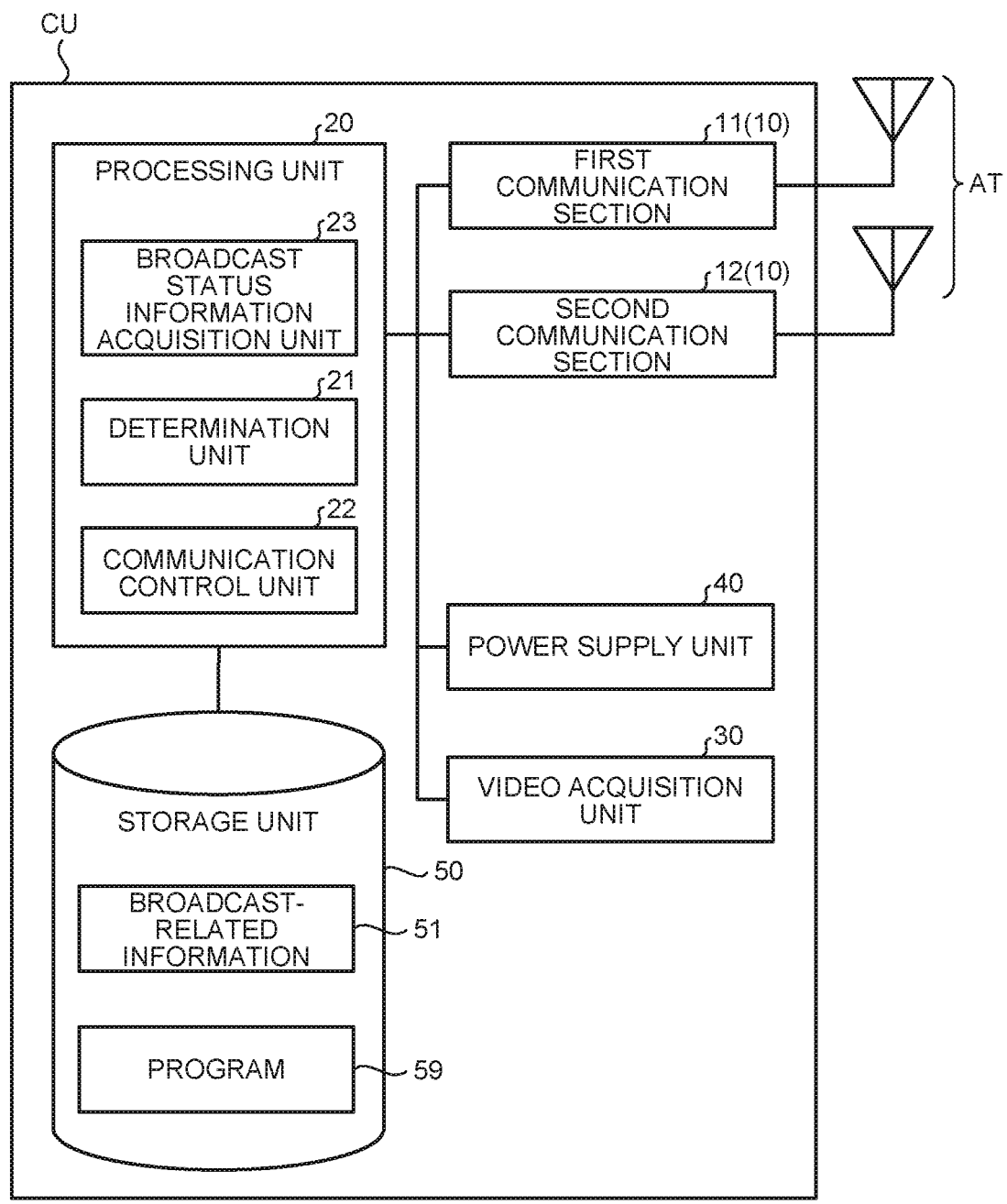
FIG. 4 is a diagram illustrating an exemplary configuration of a communication unit.

FIG. 4 is a diagram illustrating an exemplary configuration of the communication unit CU.

The communication unit CU is an information processing device that processes various information. The communication unit CU performs wired or wireless data communication with the imaging device CM, and transfers the video acquired from the imaging device CM to the production site by wireless communication. The communication unit CU includes, for example, a plurality of communication sections 10, antenna units AT, a processing unit 20, a video acquisition unit 30, a power supply unit 40, and a storage unit 50.

The plurality of communication sections 10 uses different communication schemes. The plurality of communication sections 10 includes, for example, a first communication section 11 and a second communication section 12. The first communication section 11 uses a communication scheme such as 5G having a large communication capacity (communication speed) and consuming a large amount of power. The second communication section 12 uses a communication scheme such as 4G/LTE having a smaller communication capacity and consuming a smaller amount of power, as compared with the first communication section 11. In general, as the communication capacity increases, the communication performance increases, but the power consumption also increases. The communication performance and the power consumption are a trade-off. The communication sections 10 each transmit and receive an image, voice information, and the like to and from an external device via each of the antenna units AT.

The video acquisition unit 30 performs wired or wireless data communication with the imaging device CM, and acquires the video captured by the imaging device CM. The video acquisition unit 30 supplies the video acquired from the imaging device CM to the processing unit 20.

The processing unit 20 provides various functions of the communication unit CU. The processing unit 20 includes, for example, a determination unit 21, a communication control unit 22, and a broadcast status information acquisition unit 23.

The determination unit 21 determines whether to perform communication by using which communication scheme, on the basis of broadcast-related information 51 acquired from the storage unit 50, broadcast status information acquired from the broadcast status information acquisition unit 23, external power supply information acquired from the power supply unit 40, and the like. The communication control unit 22 controls each communication section 10 corresponding to the communication scheme determined by the determination unit 21, and performs communication.

The broadcast-related information 51 includes various pieces of information indicating the positioning of the video to be transmitted, in the broadcast program. For example, the broadcast-related information 51 includes broadcast information indicating the broadcast use of the video to be transferred. The broadcast use includes the live streaming and the pre-recorded broadcasting. The broadcast-related information 51 may include information indicating the broadcasting time of the broadcast program, a video shooting location (the position of the shooting location), and the like.

For example, the broadcast-related information 51 may be recorded as planning meta-information. The planning meta-information is information that describes a shooting plan. When the item name of interview/record, the name of reporter/director, the name of the camera operator, and the like are recorded in advance on a disk as the planning meta information, and loaded and recorded on the imaging device CM, recording is performed in association with the meta-information. The imaging device CM is allowed to perform imaging by using a title defined in advance in the planning meta-information, as the name of a video clip.

The broadcast status information is information indicating the status of utilization of the video in live streaming. The broadcast status information includes information ("PGM OUT") indicating that the video is currently broadcasted and information ("Next") indicating that the video is to be switched as a next video broadcasted. The broadcast status information is supplied from the production site to the broadcast status information acquisition unit 23 via any of the communication sections 10.

Videos whose broadcast status information indicating "PGM OUT" and "Next" are videos that are to be distributed to the viewer AU. Therefore, high image quality is required. A video whose broadcast status information is other than "PGM OUT" or "Next" is a video that is used only for the editor PR to confirm the contents of the video. Therefore, high image quality is not required.

For example, the determination unit 21 selects one communication section 10 from the plurality of communication sections 10 having different communication schemes, on the basis of the broadcast information. For example, when the broadcast information indicates live streaming, the determination unit 21 is configured to select the first communication section 11 having higher communication performance in order to provide a high-quality video to the production site.

However, even when the broadcast information indicates the live streaming, the communication section 10 can be selected, on the basis of the status of utilization (current broadcast status) of the video to be transferred. In other words, the determination unit 21 is configured to acquire the broadcast status information indicating the status of utilization of the video from the broadcast status information acquisition unit 23, and select the communication section 10 on the basis of the broadcast status information. For example, when the broadcast status information indicates "PGM OUT" or "Next", high image quality is required for the video to be transferred. Therefore, the determination unit 21 selects the communication section 10 having a higher communication performance than that when the video whose broadcast status information indicates a state other than "PGM OUT" or "Next".

Note that, in the present disclosure, the same communication section 10 (first communication section 11) is selected for both of the video whose broadcast status information indicates "Next" and the video whose broadcast status information indicates "PGM OUT". However, the highest-priority video is a video currently broadcasted. Therefore, the first communication section 11 may be selected only when the broadcast status information indicates "PGM OUT", and the second communication section 12 may be selected when the broadcast status information indicates "Next". In other words, when the broadcast status information indicates "PGM OUT", the determination unit 21 may select the communication section 10 having the higher communication performance than that when the broadcast status information indicates a state other than "PGM OUT".

When the broadcast information indicates pre-recorded broadcasting, the determination unit 21 is configured to select the second communication section 12. In some cases, the video for the pre-recorded broadcasting is used only for confirming the contents of the video or performing pre-editing work. In such a case, high image quality is not required, and therefore, it is preferable to select the second communication section 12 that is configured to suppress power consumption although communication performance is low.

However, in some cases, even when the broadcast information indicates the pre-recorded broadcasting, wireless acquisition of the video from the shooting location is desired for immediate editing, due to tight schedule of editing. Therefore, the determination unit 21 is configured to select the communication section 10 on the basis of a time available for editing of the video for recording, even when the broadcast information indicates the pre-recorded broadcasting. For example, in an urgent case where the time available for editing is equal to or less than a predetermined amount of time, the determination unit 21 selects the communication section 10 having the higher communication performance than that in a non-urgent case where the time available for editing is larger than the predetermined amount of time.

The determination unit 21 is configured to determine the time available for editing, on the basis of the information indicating the position of the shooting location and broadcasting time of a recorded video. Information indicating the position of the shooting location and broadcasting time of the recorded video is included in the broadcast-related information 51.

The power supply unit 40 manages a battery of the communication unit CU. The power supply unit 40 notifies the processing unit 20 of a remaining power supply capacity.

The determination unit 21 selects the communication section 10 based on the broadcast status information, according to a remaining battery capacity. For example, if the first communication section 11 consuming a large amount of power is continuously used under a low remaining capacity condition where the remaining battery capacity is equal to or less than a predetermined value, there is a possibility that the battery runs out during communication and video cannot be transmitted. Therefore, under the low remaining capacity condition, the determination unit 21 preferentially selects the second communication section 12, as much as possible. The determination unit 21 performs selection of the communication section 10 based on the broadcast status information, when the remaining battery capacity satisfies the low remaining capacity condition.

The low remaining capacity condition is defined, for example, as a condition where a remaining battery capacity $V_c$ satisfies $V_c - V_{Est} \le V_{th}$. A symbol $V_{Est}$ indicates an estimated battery capacity that is estimated to be used until the end of live streaming. A symbol $V_{th}$ is a preset threshold. The threshold $V_{th}$ has a value of 0 or more.

The storage unit 50 stores, for example, the broadcast-related information 51 and a program 59 executed by the processing unit 20. The program 59 is a program that causes a computer to perform information processing according to the present disclosure. The processing unit 20 performs various processing in accordance with the program 59 stored in the storage unit 50. Furthermore, the storage unit 50 may be used as a work area that temporarily stores a result of the processing by the processing unit 20. The storage unit 50 includes, for example, any non-transitory storage medium such as a semiconductor storage medium and a magnetic storage medium. The storage unit 50 includes, for example, a magnetic disk, an optical disk, a magneto-optical disk, a flash memory, or the like. The program 59 is stored, for example, in a non-transitory computer-readable storage medium.

The processing unit 20 is, for example, a computer that includes a processor and a memory. The memory of the processing unit 20 includes a random access memory (RAM) and a read only memory (ROM). The processing unit 20 executes the program 59 to function as the determination unit 21, the communication control unit 22, and the broadcast status information acquisition unit 23.

4. Configuration of Imaging Device

Figure 5:
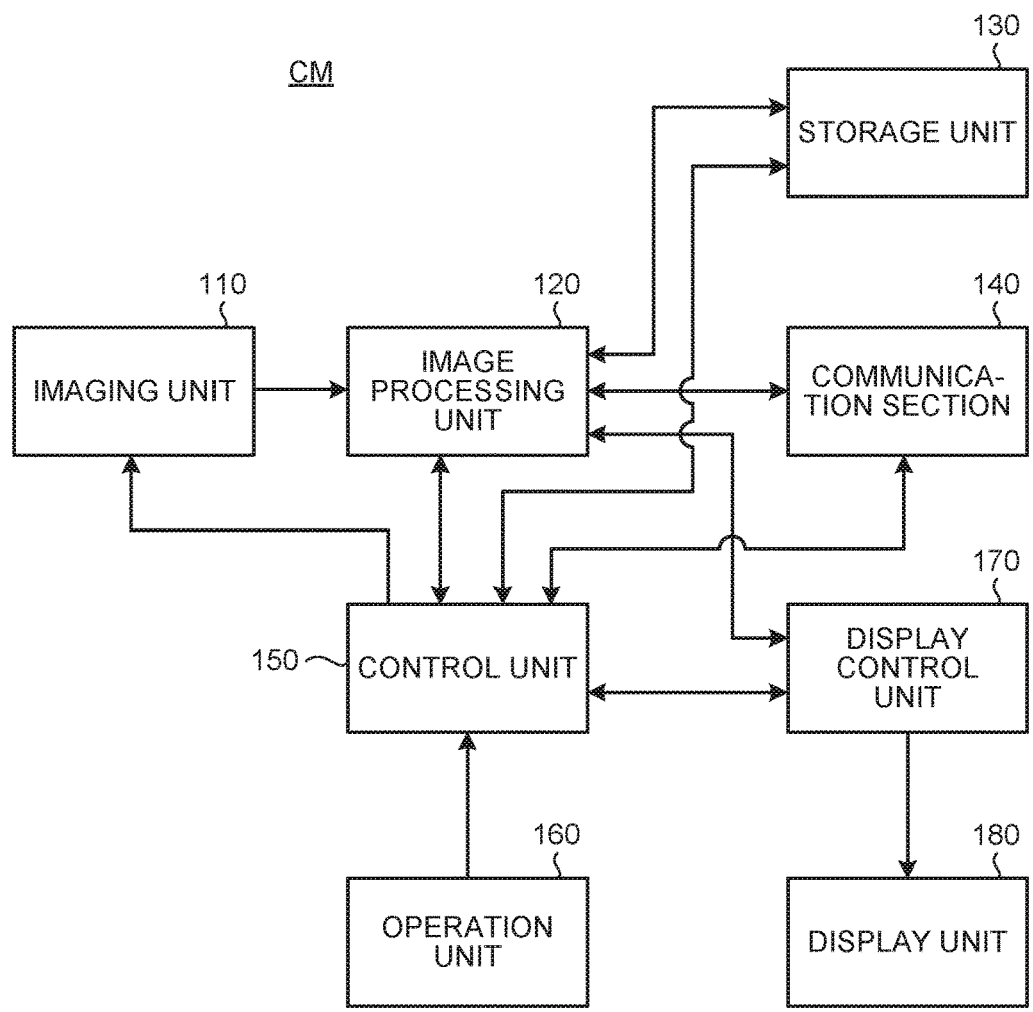
FIG. 5 is a diagram illustrating an exemplary configuration of an imaging device.

FIG. 5 is a diagram illustrating an exemplary configuration of the imaging device CM.

The imaging device CM includes an imaging unit 110, an image signal processing unit 120, a storage unit 130, a control unit 150, an operation unit 160, a display control unit 170, a display unit 180, and a communication section 140.

The imaging unit 110 includes an imaging optical system and an image sensor, for imaging. Furthermore, the image sensor is an imaging element, such as a charge coupled device (CCD) sensor, a complementary metal oxide semiconductor (CMOS) sensor, and the image sensor receives light incident from a subject via the imaging optical system, converts the light to an electric signal, and outputs the electric signal. The image sensor performs, for example, correlated double sampling (CDS) processing, automatic gaincontrol (AGC) processing, and the like on the electric signal obtained by photoelectrically converting the received light, and further performs analog/digital (A/D) conversion processing. Then, image data as digital data is output to the image signal processing unit 120 on the downstream side.

The image signal processing unit 120 is constituted, as an image processing processor, for example, by a digital signal processor (DSP) or the like. The image signal processing unit 120 performs various processing on the image data input from the imaging unit 110.

For example, when an image signal is assumed as a normal visible light image, the image signal processing unit 120 performs clamp processing of clamping the black levels of red (R), green (G), and blue (B) to a predetermined signal level, correction processing between color channels of R, G, and B, color separation processing (or demosaicing when a mosaic color filter such as a Bayer filter is used) of allocating all color components of R, G, and B to the image data for each pixel, or processing of generating (separating) a brightness (Y) signal and a color (C) signal, and the like.

The image signal processing unit 120 performs necessary resolution conversion processing, for example, resolution conversion for storage, communication output, or monitor image, on the image signal subjected to various signal processing, in some cases. The image signal processing unit 120 performs, for example, compression encoding processing for storage, on the image data whose resolution has been converted, in some cases. When the compression encoding processing is performed on the image data, a compression rate may be changed according to the communication performance of the selected communication section 10. For example, when the second communication section 12 is selected by the determination unit 21, the compression encoding processing is performed at a higher compression rate than that when the first communication section 11 is selected.

The control unit 150 includes a microcomputer (arithmetic processing device) including a central processing unit (CPU), a ROM, a RAM, a flash memory, and the like.

The CPU executes a program stored in the ROM, the flash memory, or the like to integrally control the imaging device CM as a whole. The RAM is used for temporary storage of data, programs, and the like, as a work area to process various data of the CPU. The ROM and the flash memory (nonvolatile memory) are used to store an operating system (OS) for the CPU to control each unit, content files such as image files, application programs for various operations, firmware, and the like.

The control unit 150 performs control of imaging operation such as shutter speed, exposure adjustment, and frame rate in the imaging unit 110, control of parameters of various signal processing in the image signal processing unit 120, and the like. Furthermore, the control unit 150 performs setting processing, imaging operation control, display operation control, and the like, according to a user's operation.

The operation unit 160 is assumed to be an operation element such as a key, switch, or dial, a touch panel, or the like that are provided in a device housing. The operation unit 160 transmits a signal according to an input operation, to the control unit 150.

The display unit 180 is a display unit that provides various displays for the user (camera operator or the like), and that includes, for example, a display device such as a liquid crystal display (LCD) or organic electro-luminescence (EL) display.

The display control unit 170 performs processing of causing the display unit 180 to perform a display operation. For example, the display control unit 170 includes a character generator, a display driver, and the like, and causes the display unit 180 to present various displays under the control of the control unit 150. For example, the display control unit 170 causes the display unit 180 to display a through-image or reproduce and display a still image or moving image recorded on a recording medium, or to display various operation menus, icons, messages, or the like, that is, a graphical user interface (GUI), on a screen.

The storage unit 130 includes, for example, a nonvolatile memory, and stores, for example, an image file such as still image data or moving image data captured by the imaging unit 110, attribute information of the image file, a thumbnail image, and the like.

Various actual modes of the storage unit 130 can be considered. For example, the storage unit 130 may be a flash memory incorporated in the imaging device CM, or may be a memory card (e.g., portable flash memory) attachable to and detachable from the imaging device CM to have a mode in which a card recording/reproducing unit performs recording/reproducing/access to the memory card. In addition, as a mode of the storage unit 130 incorporated in the imaging device CM, the storage unit 130 may be implemented as a hard disk drive (HDD) or the like.

The communication section 140 transmits a captured image data (video) to the video acquisition unit 30 through a wired or wireless connection.

Figure 6:
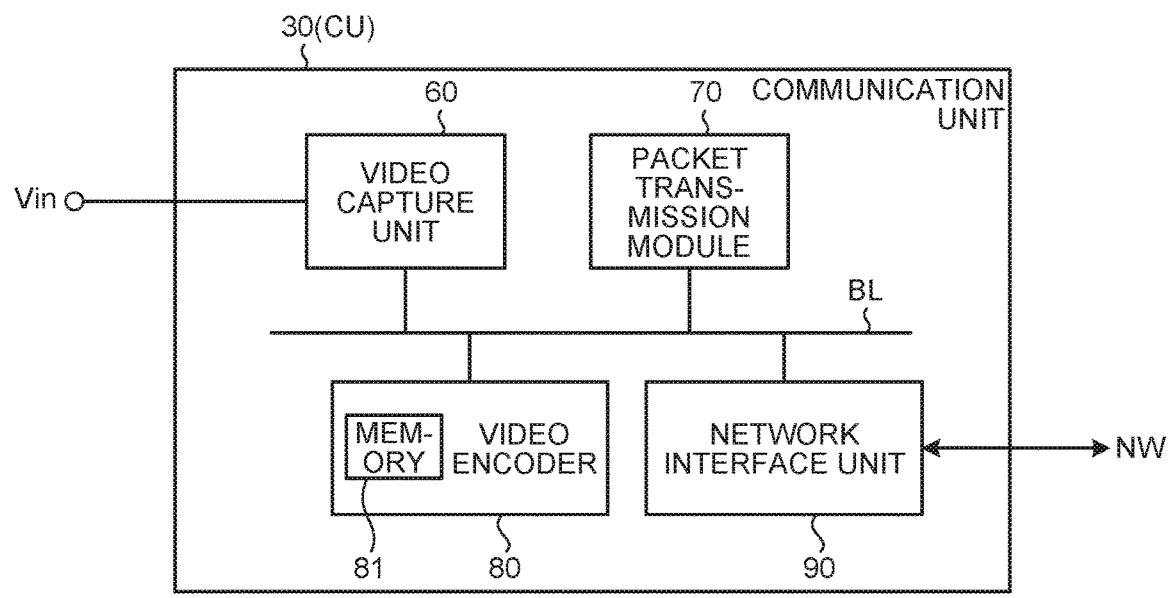
FIG. 6 is a block diagram illustrating an exemplary functional configuration of a video acquisition unit.

FIG. 6 is a block diagram illustrating an exemplary functional configuration of the video acquisition unit 30.

The video acquisition unit 30 includes a video capture unit 60, a packet transmission module 70, a video encoder 80, a memory 81, and a network interface unit 90.

For example, image data (frame data) Vin of each frame processed by the image signal processing unit 120 is input to the video capture unit 60. For example, uncompressed frame data are input at predetermined time intervals (frame intervals according to the frame rate of the imaging operation of the imaging device CM). "Frame data" refers to image data per frame.

The video capture unit 60 transfers the input image data Vin per frame to the video encoder 80 via a bus BL. The bus BL is, for example, a bus such as a peripheral component interconnect express (PCIe).

The video encoder 80 performs encoding processing for compression encoding per frame data, and transfers the encoded frame data to the packet transmission module 70 via the bus BL. The packet transmission module 70 performs packet fragmentation processing for transmission, and performs processing to cause the network interface unit 90 to transmit and output video stream data per frame.

5. Video Streaming

Figure 7:
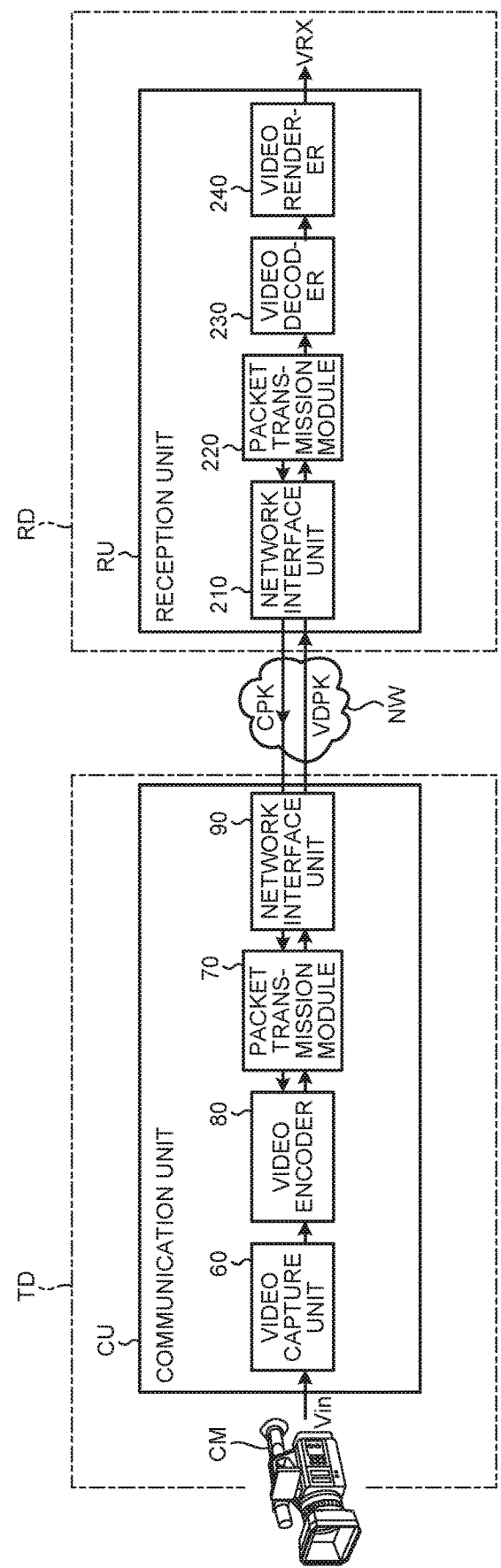
FIG. 7 is a diagram illustrating an overview of video stream transmission between a transmission-side device and a reception-side device.
Figure 8:
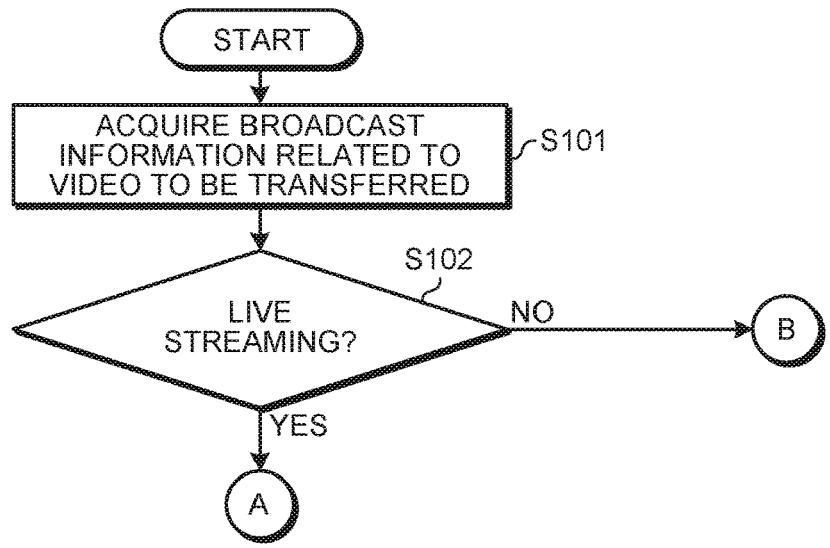
FIG. 8 is a flowchart illustrating an example of an information processing method performed by the communication unit.
Figure 9:
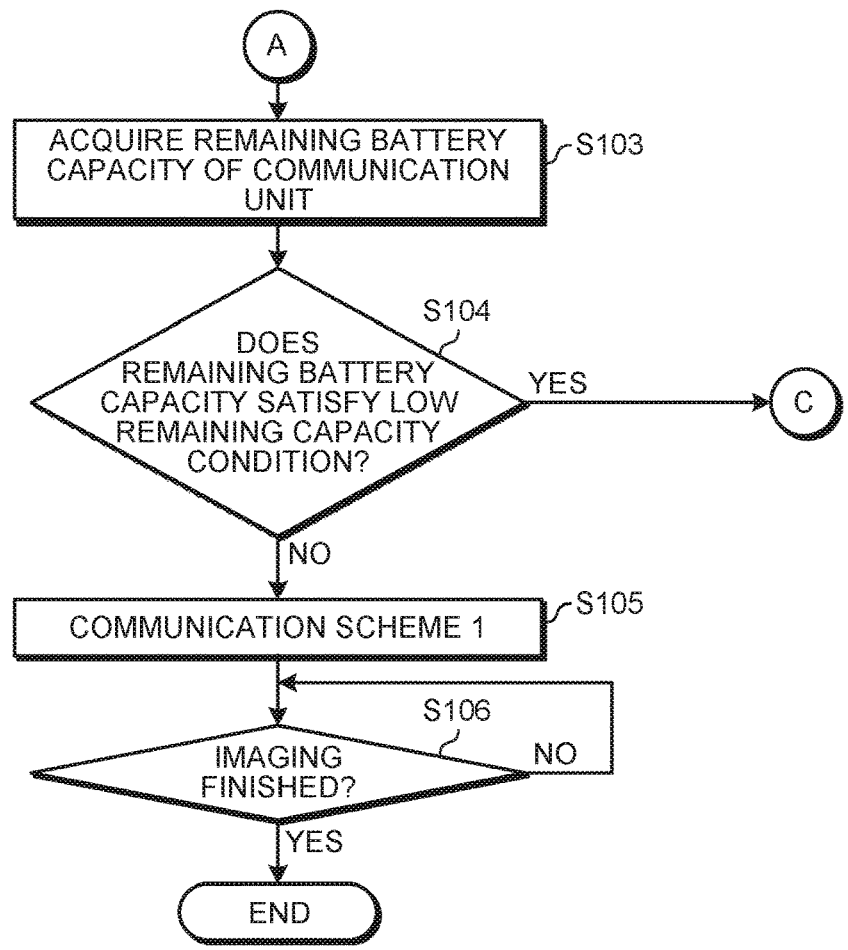
FIG. 9 is a flowchart illustrating an example of the information processing method performed by the communication unit.
Figure 10:
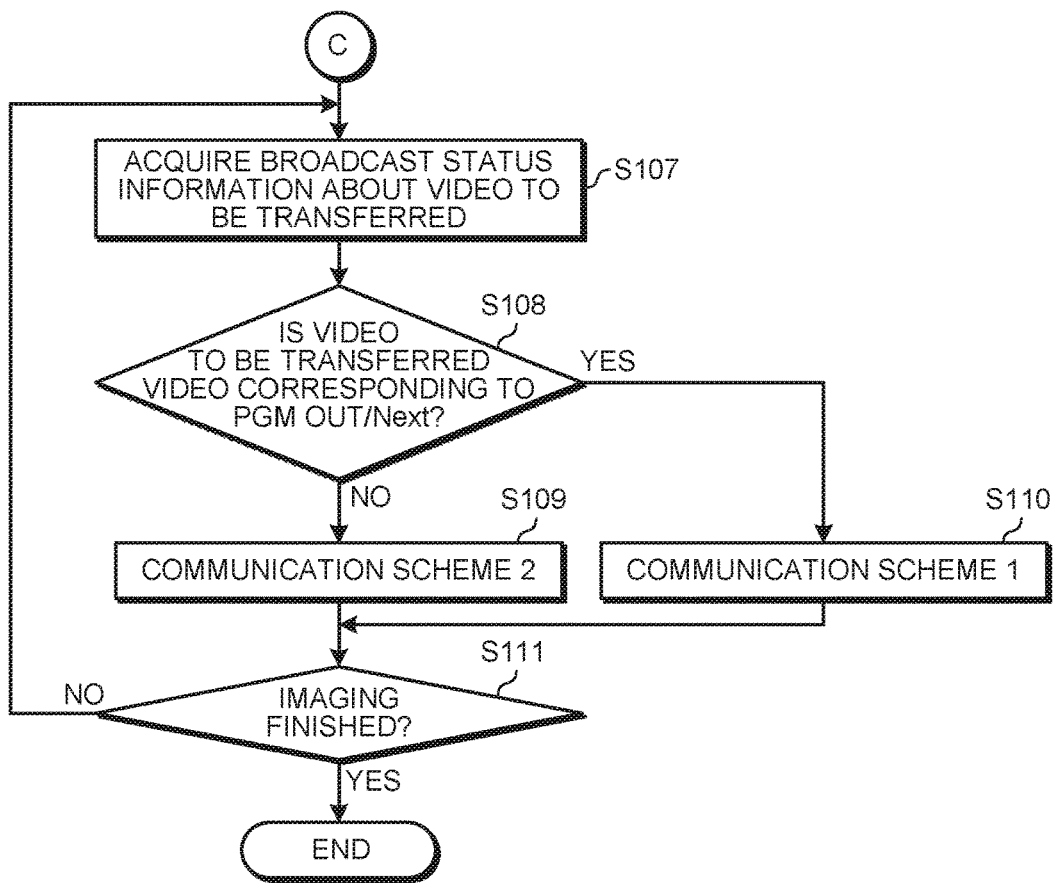
FIG. 10 is a flowchart illustrating an example of the information processing method performed by the communication unit.
Figure 11:
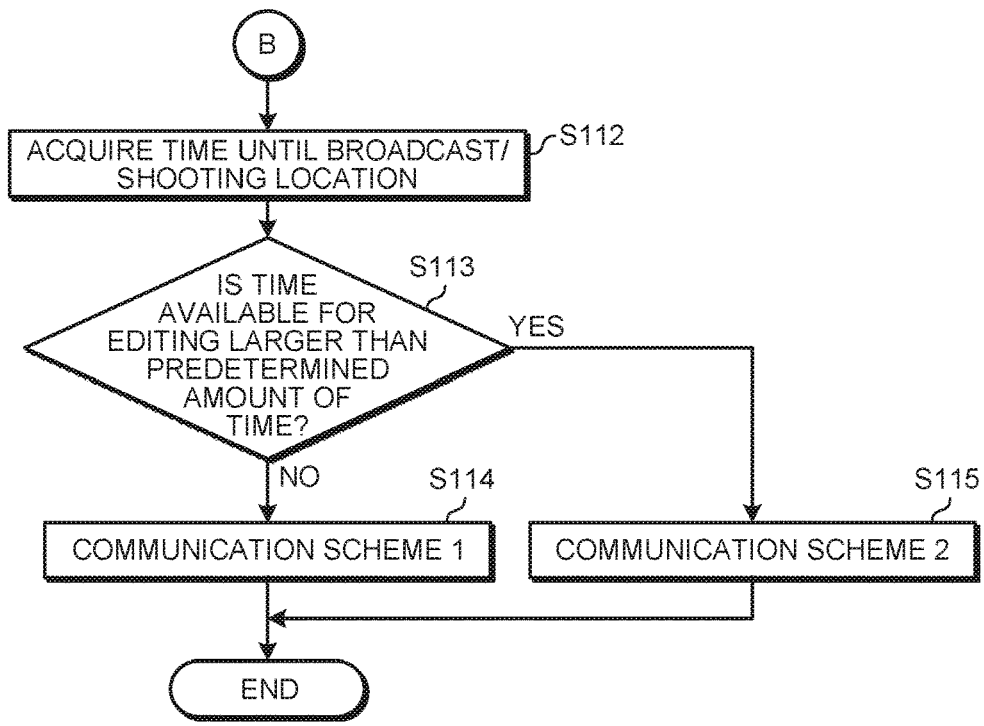
FIG. 11 is a flowchart illustrating an example of the information processing method performed by the communication unit.

FIG. 7 is a diagram illustrating an overview of video stream transmission between a transmission-side device TD and the reception-side device RD. The transmission-side device TD includes the imaging device CM and communication unit CU.

In the communication unit CU, the image data Vin input to the video capture unit 60 is encoded by the video encoder 80 and packetized by the packet transmission module 70. This video data packet VDPK is transmitted to the network NW through the network interface unit 90.

The reception-side device RD includes a reception unit RU. In the reception unit RU, the video data packet VDPK is received through a network interface unit 210 and taken into a packet receiving module 220. Then, frame data having been compressed is extracted from each packet and subjected to decoding processing in a video decoder 230 against compressing. Then, video stream data VRX received is output via a video renderer 240.

In such a transmission/reception system, a transmission delay may occur. Therefore, the reception unit RU sequentially transmits a control packet CPK to the communication unit CU and transmits status information. For example, the control packet CPK includes information that helps to notify of the current reception rate, delay amount, and packet loss rate in the reception unit RU.

Receiving the control packet CPK makes it possible to control the packet transmission module 70 of the communication unit CU to recognize the current state of the network, to change (decrease or increase) a transmittable rate, to instruct the video encoder 80 to change (decrease or increase) an encoding rate (i.e., increase or decrease the compression rate).

6. Information Processing Method

FIGS. 8 to 11 are a flowchart illustrating an example of an information processing method performed by the communication unit CU. In the communication unit CU, for example, the communication scheme (second communication section 12) having a lower communication performance is adopted as a default communication scheme.

In Step S101, the determination unit 21 acquires the broadcast information indicating the broadcast use of the video captured by the imaging device CM. Then, in Step S102, the determination unit 21 determines whether the broadcast use is for live streaming, on the basis of the acquired broadcast information.

In Step S102, when it is determined that the broadcast use is for live streaming (Step S102: Yes), the process proceeds to Step S103. In Step S103, the determination unit 21 acquires the current remaining battery capacity of the communication unit CU. Then, in Step S104, the determination unit 21 determines whether the remaining battery capacity satisfies the low remaining capacity condition.

In Step S104, when it is determined that the remaining battery capacity does not satisfy the low remaining capacity condition (Step S104: No), the process proceeds to Step S105. In Step S105, the determination unit 21 selects the first communication section 11.

Nest, in Step S106, the determination unit 21 determines whether imaging is finished. When operation information about an imaging end button or the like is acquired from the imaging device CM, the determination unit 21 determines that the imaging is finished. In Step S106, when it is determined that the imaging is finished (Step S106: Yes), the process is finished. In Step S106, when it is determined that the imaging is not finished (Step S106: No), the process returns to Step S106, and the processing described above is repeated until the imaging is finished.

In step S104, when it is determined that the remaining battery capacity satisfies the low remaining capacity condition (Step S104: Yes), the process proceeds to Step S107. In Step S107, the determination unit 21 acquires the broadcast status information indicating the status of utilization of the video to be transferred. Then, in Step S108, the determination unit 21 determines whether the video to be transferred is used as a video corresponding to "PGM OUT" or "Next", on the basis of the broadcast status information.

In Step S108, when it is determined that the video to be transferred is the video corresponding to "PGM OUT" or "Next" (Step S108: Yes), the process proceeds to Step S109. In Step S109, the determination unit 21 selects the second communication section 12, and the process proceeds to Step S111. In Step S108, when it is determined that the video to be transferred is a video other than "PGM OUT" or "Next" (Step S108: No), the process proceeds to Step S110. In Step S110, the determination unit 21 selects the first communication section 11, and the process proceeds to Step S111.

In Step S111, the determination unit 21 determines whether the imaging is finished. In Step S111, when it is determined that the imaging is finished (Step S111: Yes), the process is finished. In Step S111, when it is determined that the imaging is not finished (Step S111: No), the process returns to Step S107, and the processing described above is repeated until imaging is finished.

In Step S102, when it is determined that the broadcast use is for pre-recorded broadcasting (Step S102: No), the process proceeds to Step S112. In Step S112, the determination unit 21 acquires the information about a time until the broadcasting of a broadcast program using the captured video and the position of the shooting location. Then, in Step S113, the determination unit 21 determines whether the time available for editing the video is larger than the predetermined amount of time (urgent case or non-urgent case). The time available for editing is calculated from, for example, the arrival time to the production site from the shooting location and the time until the broadcasting time.

In Step S113, when it is determined that the time available for editing the video is equal to or less than the predetermined amount of time (urgent case) (Step S113: No), the process proceeds to Step S114. In Step S114, the determination unit 21 selects the first communication section 11, and the process is finished. In Step S113, when it is determined that the time available for editing the video is larger than the predetermined amount of time (non-urgent case) (Step S113: Yes), the process proceeds to Step S115. In Step S115, the determination unit 21 selects the second communication section 12 and the process is finished.

7. Exemplary Hardware Configuration

FIG. 12 is a block diagram illustrating an exemplary hardware configuration of the communication unit CU.

The communication unit CU includes, for example, a processor 871, ROM 872, RAM 873, a host bus 874, a bridge 875, an external bus 876, an interface 877, an input device 878, an output device 879, a storage 880, a drive 881, a connection port 882, and a communication device 883. Note that the hardware configuration shown here is merely an example, and some of the component elements may be omitted. In addition, a component element other than the component elements shown here may be further included.

The processor 871 functions, for example, as an arithmetic processing device or a control device, and controls all or some of the operations of the component elements, on the basis of various programs recorded in the ROM 872, the RAM 873, the storage 880, on a removable recording medium 901.

The ROM 872 is a unit that stores a program read by the processor 871, data used for calculation, and the like. The RAM 873 temporarily or permanently stores, for example, a program read by the processor 871, various parameters appropriately changing upon running the program, and the like.

The processor 871, the ROM 872, and the RAM 873 are connected to each other, for example, via the host bus 874 configured to transmit data at high speed. Meanwhile, the host bus 874 is connected to, for example, the external bus 876 configured to transmit data at relatively low speed, via the bridge 875. In addition, the external bus 876 is connected to various component elements via the interface 877.

For the input device 878, for example, a mouse, a keyboard, a touch screen, a button, a switch, a lever, and the like are used. Furthermore, for the input device 878, a remote controller configured to transmit the control signal by using an infrared ray or other radio waves is used, in some cases. Furthermore, the input device 878 includes a voice sound input device such as a microphone.

The output device 879 is a device, such as a display device including a cathode ray tube (CRT), LCD, or organic EL, an audio output device including a speaker or headphone, a printer, a mobile phone, or a facsimile, that is configured to visually or audibly notify the user of acquired information. Furthermore, the output device 879 according to the present disclosure includes various vibrating devices configured to output tactile stimulation.

The storage 880 is a device for storing various data. For the storage 880, for example, a magnetic storage device such as a hard disk drive (HDD), a semiconductor storage device, an optical storage device, a magneto-optical storage device, or the like is employed.

The drive 881 is, for example, a device that reads information recorded on the removable recording medium 901 such as a magnetic disk, optical disk, magneto-optical disk, or semiconductor memory, and writes information on the removable recording medium 901.

The removable recording medium 901 is, for example, a DVD medium, a Blu-ray (registered trademark) medium, an HD DVD medium, various semiconductor storage media, or the like. As a matter of course, the removable recording medium 901 may be, for example, an IC card with a non-contact IC chip, an electronic device, or the like.

The connection port 882 is, for example, a port for connecting an externally connected device 902, such as a universal serial bus (USB) port, IEEE1394 port, small computer system interface (SCSI), RS-232C port, or optical audio terminal.

The externally connected device 902 includes, for example, a printer, a portable music player, a digital camera, a digital camcorder, or an IC recorder.

The communication device 883 is a communication device for connection to a network, and is, for example, a communication card for wired or wireless LAN, Bluetooth (registered trademark), or wireless USB (WUSB), an optical communication router, an asymmetric digital subscriberline (ADSL) router, various communication modems, or the like.

Furthermore, the communication device 883 includes a communication interface that supports wireless communication schemes such as 5G-NR, LTE, and LTE-Advanced. Specifically, the communication device 883 may include a baseband processor that performs signal processing such as encoding, decoding, and modulation/demodulation. Furthermore, the communication device 883 may include an RF circuit. Furthermore, the communication device 883 may include an antenna that radiates a radio wave into space and converts a radio wave in space into a signal.

8. Effects

The communication unit CU includes the processing unit 20. The processing unit 20 selects one communication section 10 from the plurality of communication sections 10 having different communication schemes, on the basis of the broadcast information indicating the broadcast use of the video to be transferred. In the information processing method of the present embodiment, the processing of the communication unit CU described above is performed by the computer. The program of the present embodiment causes a computer to implement the above processing of the communication unit CU.

This configuration makes it possible to suppress power consumption while securing sufficient communication quality.

When the broadcast information indicates the live streaming, the processing unit 20 selects the communication section 10, on the basis of the broadcast status information indicating the status of utilization of the video.

This configuration makes it possible to select an appropriate communication section 10, on the basis of the status of utilization of the video.

When the broadcast status information is the information ("PGM OUT") indicating that the video is currently broadcasted, the processing unit 20 selects the communication section 10 having the higher communication performance than that when the broadcast status information indicates a state other than "PGM OUT".

This configuration makes it also possible to suppress power consumption while improving the communication quality of the video currently broadcasted.

When the broadcast status information is the information ("PGM OUT") indicating that the video is currently broadcasted or the information ("Next") indicating that the video is to be switched as a next video broadcasted, the processing unit 20 selects the communication section 10 having the higher communication performance than that when the broadcast status information indicates a state other than "PGM OUT" or "Next".

This configuration also makes it also possible to suppress the power consumption while improving the communication quality of the video currently broadcasted or the video scheduled to be broadcasted next.

The processing unit 20 selects the communication section 10 based on the broadcast status information, according to the remaining battery capacity.

This configuration selects an appropriate communication section 10 according to battery endurance.

The processing unit 20 performs selection of the communication section 10 based on the broadcast status information, when the low remaining capacity condition is satisfied in which the remaining battery capacity is equal to or less than the predetermined value.

This configuration makes it possible to maximize the communication quality.

When the broadcast information indicates the pre-recorded broadcasting, the processing unit 20 selects the communication section 10 on the basis of the time available for editing of the video for recording.

This configuration makes it possible to transfer the video in a high-quality communication environment according to the urgency of editing, even in the pre-recorded broadcasting, prompting the editor PR to perform editing early.

In the urgent case where the time available for editing is equal to or less than the predetermined amount of time, the processing unit selects the communication section 10 having the higher communication performance than that in the non-urgent case where time available for editing is larger than the predetermined amount of time.

This configuration makes it possible to immediately start the editing by using the video transferred in the high-quality communication environment, even in a tight schedule of editing.

The processing unit 20 determines the time available for editing, on the basis of the information indicating the position of the shooting location and broadcasting time of the recorded video.

This configuration makes it possible to accurately estimate the time available for editing.

Note that the effects described herein are merely examples and are not limited to the description, and other effects may be provided.

9. Modification

In the embodiments described above, 5G and 4G/LTE are exemplified as a combination of communication schemes having different communication performances. Although the communication schemes have been switched between 5G and 4G/LTE, the combination of the communication schemes is not limited thereto. The communication schemes may be switched between Wireless Fidelity (Wi-Fi) (registered trademark) and 3G.

Supplementary Note

Note that the present technology can also have the following configurations.

(1)
An information processing device comprising a processing unit that selects one communication section from a plurality of communication sections having different communication schemes, based on broadcast information indicating a broadcast use of a video to be transferred.

(2)
The information processing device according to (1), wherein
the processing unit selects the communication section, based on broadcast status information indicating a status of utilization of the video when the broadcast information indicates live streaming.

(3)
The information processing device according to (2), wherein
when the broadcast status information is information indicating that the video is currently broadcasted, the processing unit selects the communication section having a higher communication performance than that when the broadcast status information is other than the information indicating that the video is currently broadcasted.

(4)
The information processing device according to (2), wherein
when the broadcast status information is information indicating that the video is currently broadcasted, the processing unit selects the communication section having the higher communication performance than that when the broadcast status information is other than the information indicating that the video is currently broadcasted or information indicating that the video is to be switched as a next video broadcasted.

(5)
The information processing device according to (2), wherein
when the broadcast status information is information indicating that the video is to be switched as a next video broadcasted, the processing unit selects the communication section having the higher communication performance than that when the broadcast status information is other than information indicating that the video is currently broadcasted or the information indicating that the video is to be switched as a next video broadcasted.

(6)
The information processing device according to any one of (2) to (5), wherein
the processing unit selects the communication section based on the broadcast status information, according to a remaining battery capacity.

(7)
The information processing device according to (6), wherein
the processing unit selects the communication section based on the broadcast status information, when a low remaining capacity condition that the remaining battery capacity is equal to or less than a predetermined value is satisfied.

(8)
The information processing device according to (1), wherein
the processing unit selects the communication section based on a time available for editing the video for recording, when the broadcast information indicates pre-recorded broadcasting.

(9)
The information processing device according to (8), wherein
in an urgent case where the time available for editing is equal to or less than a predetermined amount of time, the processing unit selects the communication section having the higher communication performance than that in a non-urgent case where the time available for editing is larger than the predetermined amount of time.

(10)
The information processing device according to (8) or (9), wherein
the processing unit determines the time available for editing, based on information indicating a position of a shooting location and broadcasting time of a recorded video.

(11)
An information processing method executed by a computer, the method comprising selecting one communication section from a plurality of communication sections having different communication schemes, based on broadcast information indicating a broadcast use of a video to be transferred.

(12)
A program for causing a computer to implement selection of one communication section from a plurality of communication sections having different communication schemes, based on broadcast information indicating a broadcast use of a video to be transferred.

REFERENCE SIGNS LIST

10 COMMUNICATION SECTION
20 PROCESSING UNIT
CU COMMUNICATION UNIT (INFORMATION PROCESSING DEVICE)

The invention claimed is:
1. An information processing device, comprising:
a processing unit configured to:

select one communication section from a plurality of communication sections having a plurality of communication schemes, based on broadcast information, wherein the broadcast information indicates a broadcast use of a video that is transferred;

select a first communication section of the plurality of communication sections based on a time available to edit the video and based on a determination that the broadcast information indicates pre-recorded broadcast; and select a second communication section of the plurality of communication sections based on communication performance of the second communication section, wherein the communication performance of the second communication section is higher at a first time available to edit the video than at a second time available to edit the video, the first time available is equal to or less than a threshold, and the second time available is more than the threshold.

2. The information processing device according to claim 1, wherein the processing unit is further configured to select a third communication section of the plurality of communication sections based on first broadcast status information, and the first broadcast status information indicating a status of utilization of the video based on a determination that the broadcast information indicates live streaming.

3. The information processing device according to claim 2, wherein the processing unit is further configured to select a fourth communication section of the plurality of communication sections based on communication performance of the fourth communication section and second broadcast status information which indicates that the video is currently broadcasted, and the communication performance of the fourth communication section is higher with the second broadcast status information than from an alternate broadcast status information which is different from the second broadcast status information.

4. The information processing device according to claim 2, wherein the processing unit is further configured to select a fifth communication section of the plurality of communication sections based on communication performance of the fifth communication section and second broadcast status information which indicates that the video is currently broadcasted, and the communication performance of the fifth communication section is higher with the second broadcast status information than with third broadcast status information which is different from the second broadcast status information and which indicates that the video is switched as a next video broadcasted.

5. The information processing device according to claim 2, wherein the processing unit is further configured to select a sixth communication section of the plurality of communication sections based on communication performance of the sixth communication section and third broadcast status information which indicates that the video is switched as a next video broadcasted, and the communication performance of the sixth communication section is higher with the third broadcast status information than with a fourth broadcast status information which is different from a second broadcast status information and the third broadcast status information, the second broadcast status information indicating that the video is currently broadcasted.

6. The information processing device according to claim 2, wherein the processing unit is further configured to select a seventh communication section from the plurality of communication sections based on the first broadcast status information and remaining battery capacity of the information processing device.

7. The information processing device according to claim 6, wherein the seventh communication section is selected based on the first broadcast status information and based on satisfaction of a low remaining battery capacity condition, and the low remaining battery capacity condition indicates that the remaining battery capacity of the information processing device is equal to or less than a specific value.

8. The information processing device according to claim 1, wherein the processing unit is further configured to determine the time available to edit, based on information indicating a position of a shooting location and broadcasting time of a recorded video.

9. An information processing method, comprising:

selecting one communication section from a plurality of communication sections having a plurality of communication schemes, based on broadcast information, wherein the broadcast information indicates a broadcast use of a video that is transferred;

selecting a first communication section of the plurality of communication sections based on a time available to edit the video and based on a determination that the broadcast information indicates pre-recorded broadcast; and selecting a second communication section of the plurality of communication sections based on communication performance of the second communication section, wherein the communication performance of the second communication section is higher at a first time available to edit the video than at a second time available to edit the video, the first time available is equal to or less than a threshold, and the second time available is more than the threshold.

10. A non-transitory computer-readable medium having stored thereon, computer-executable instructions which, when executed by a computer, cause the computer to execute operations, the operations comprising:

selecting one communication section from a plurality of communication sections having a plurality of communication schemes, based on broadcast information, wherein the broadcast information indicates a broadcast use of a video that is transferred;

selecting a first communication section of the plurality of communication sections based on a time available to edit the video and based on a determination that the broadcast information indicates pre-recorded broadcast; and selecting a second communication section of the plurality of communication sections based on communication performance of the second communication section, wherein the communication performance of the second communication section is higher at a first time available to edit the video than at a second time available to edit the video,
the first time available is equal to or less than a threshold, and
the second time available is more than the threshold.

\* \* \* \* \*